Dec. 11, 1934.  F. L. CONE  1,984,177
CHUCKING MECHANISM
Filed May 19, 1932  5 Sheets-Sheet 1
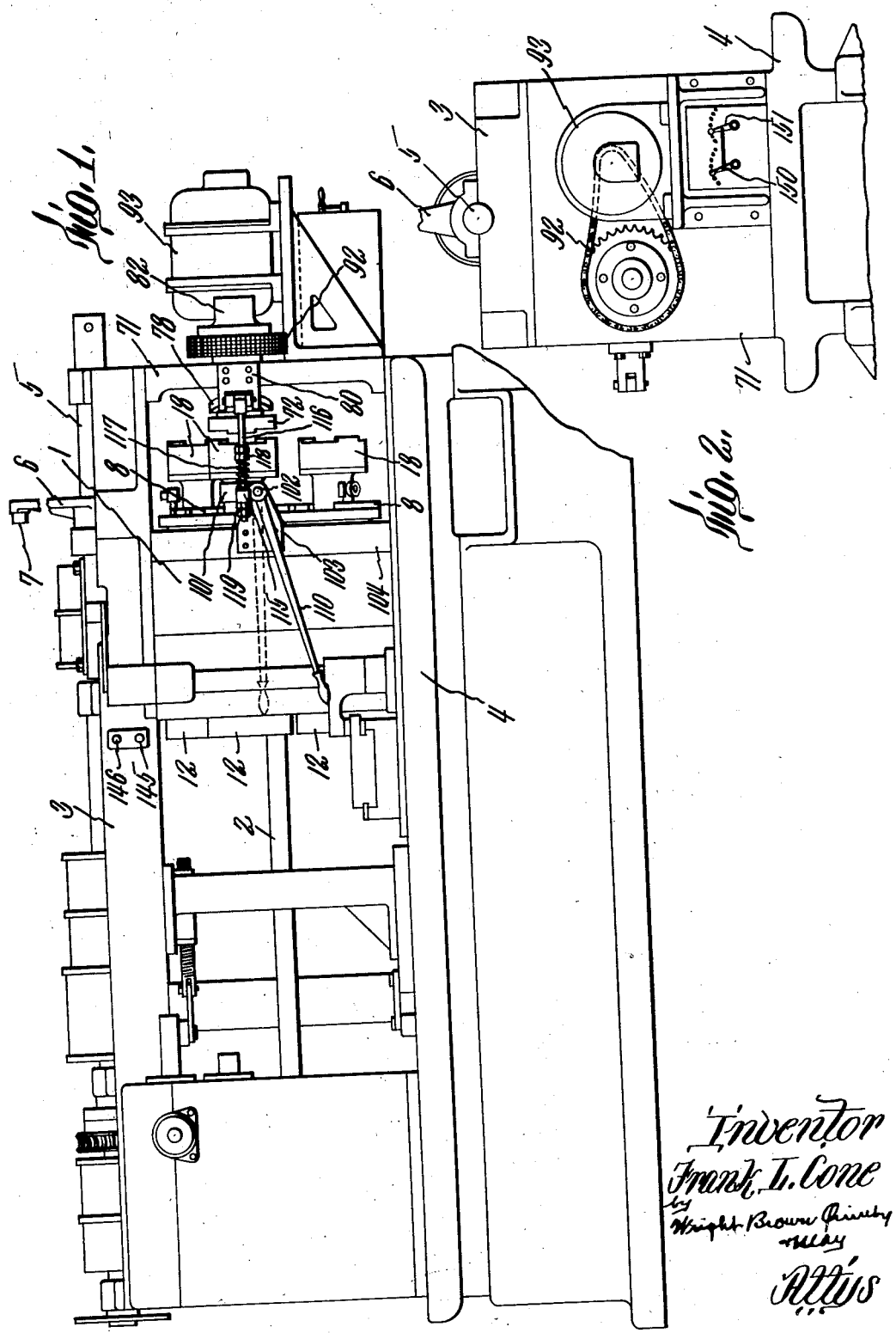

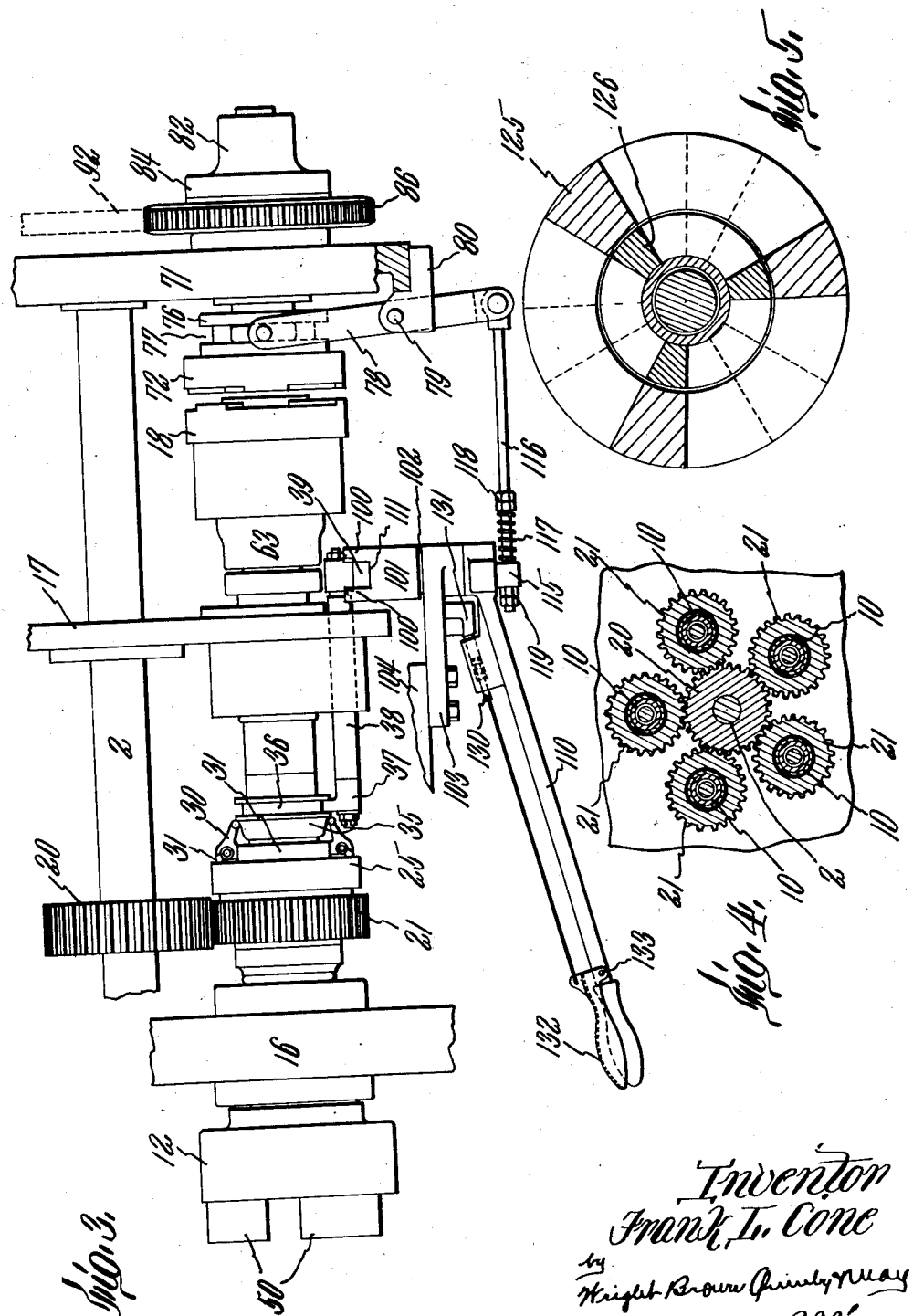

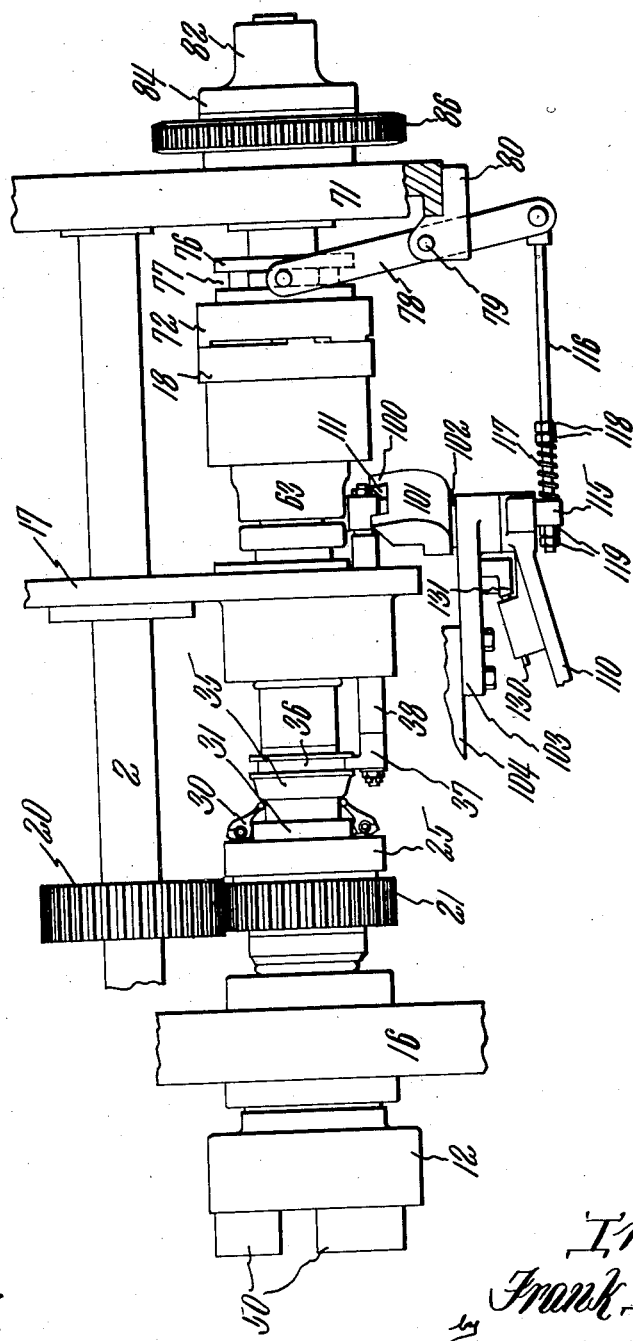

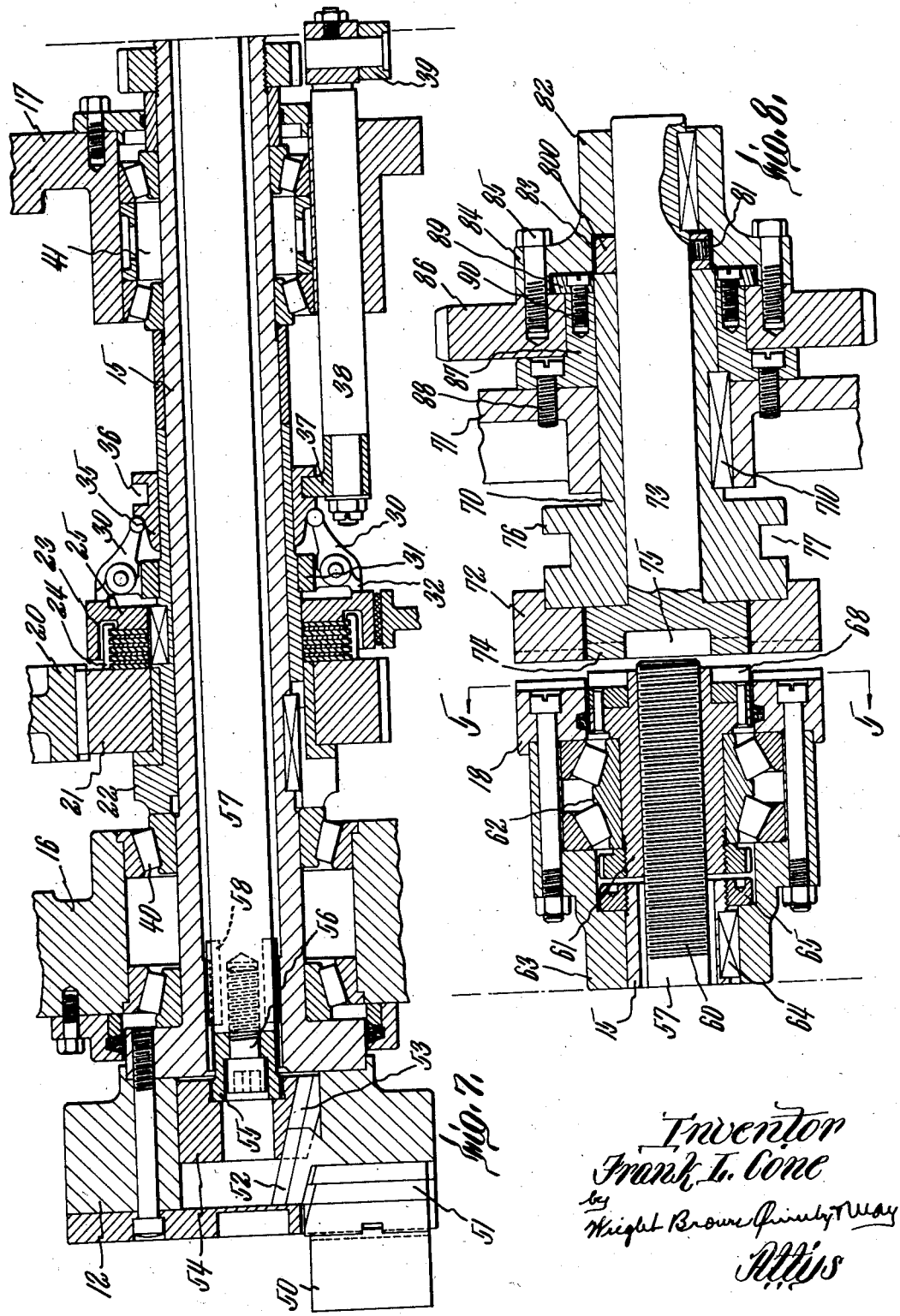

Dec. 11, 1934.  F. L. CONE  1,984,177
CHUCKING MECHANISM
Filed May 19, 1932   5 Sheets-Sheet 5
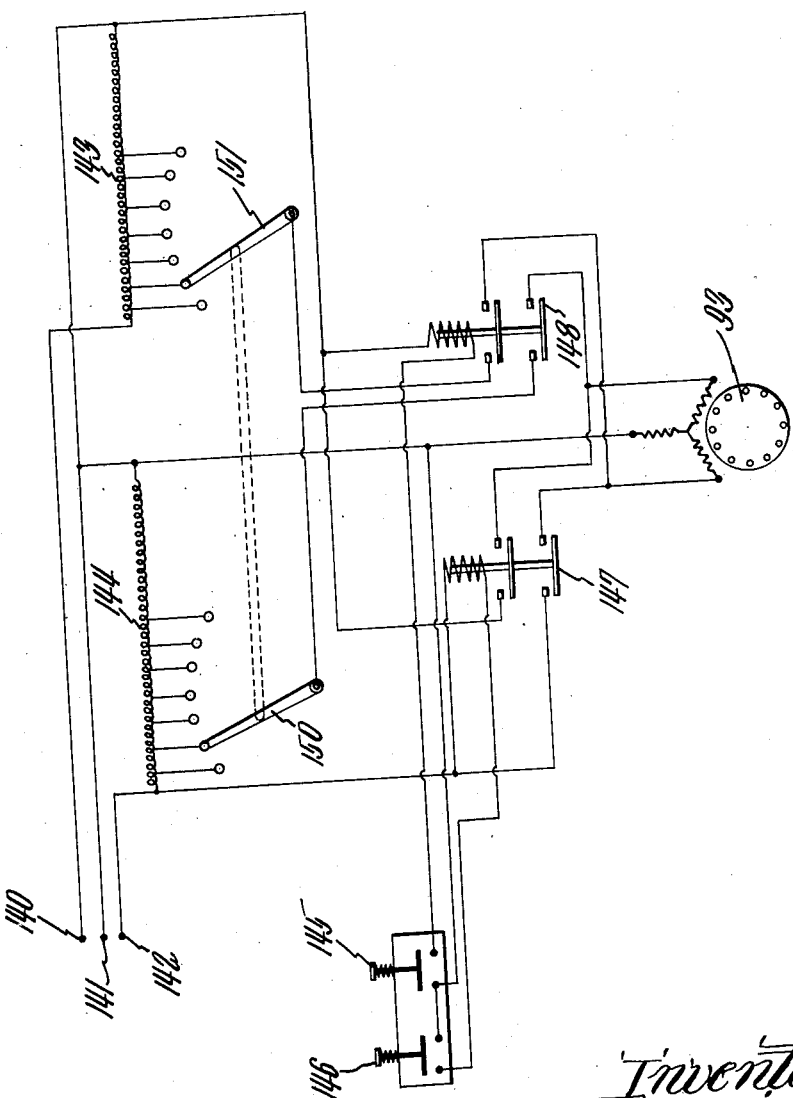

Patented Dec. 11, 1934

1,984,177

UNITED STATES PATENT OFFICE 1,984,177

CHUCKING MECHANISM

Frank L. Cone, Windsor, Vt.

Application May 19, 1932, Serial No. 612,188

20 Claims. (Cl. 29—38)

This invention relates to mechanism for quickly chucking or releasing work and has for one object to provide such a mechanism, which may be readily applied to a multi-spindle machine.

A further object is to provide such a mechanism in which the pressure of the work-gripping elements on the work may be adjusted.

For a more complete understanding of this invention, reference may be had to the accompanying drawings in which Figures 1 and 2 are somewhat diagrammatic side and end elevations, respectively, of a multi-spindle machine showing the mechanism applied thereto.

Figure 3 is a fragmentary plan to a larger scale showing a spindle in position for chucking or unchucking to be effected.

Figure 4 is a fragmentary section of the machine showing the arrangement of spindles and their driving means.

Figure 5 is a detail section on line 5—5 of Figure 8.

Figure 6 is a view similar to Figure 3, but showing the work spindle unclutched from its rotating means and connected to the stop device.

Figures 7 and 8 together show a spindle and stop and chuck mechanism in longitudinal section.

Figure 9 is a wiring diagram of the chucking and unchucking motor control.

This invention will be more particularly described with reference to a multi-spindle machine, but it should be understood that it is also applicable to a single spindle machine. Referring to Figures 1 and 2, at 1 is shown a horizontal turret rotatable about the axis of a central shaft 2 between upper and lower frame members 3 and 4. At 5 is shown a cam shaft which carries thereon an arm 6 having a cam follower roll 7 at its end, this acting on suitable cam blocks 8 on the turret 1 to index this turret to bring work spindles 10 successively into the same relative positions. At one end of each of these spindles is a chuck of any suitable description such as is shown at 12.

As shown best in Figure 4, five work spindles 10 are illustrated, though any desired number might be used. The individual work spindles are shown best in Figures 3, 6, 7 and 8. As therein shown each comprises a tubular shaft 15 journaled adjacent to opposite ends in end frame members 16 and 17 of the turret, the chuck 12 being arranged outwardly of the turret frame member 16 and the opposite end of the shaft 15 having fixed thereto a tubular toothed clutch element 18 beyond the opposite turret member 17. Each spindle is arranged to be rotated as from the central shaft 2, this shaft as shown being provided with a gear 20 which meshes with a gear 21 on each of the spindles. Each of the gears 21 is loose on its respective spindle, being journaled on a bearing member 22 keyed thereto and it may be clutched to drive its respective spindle as by the friction ring clutch shown at 23. This clutch may be of any suitable description, but as shown is of the multiple ring type, alternate rings being carried by a spider 24 fixed to the gear 21 and to a sleeve 25 keyed to but axially movable on the member 22, which in turn is keyed to the shaft 15. The clutch-actuating sleeve 25 may be moved axially as by a series of applying dogs 30, each pivotally carried on a ring 31 secured to the member 22 and having one end, as at 32, bearing on the member 25 and the other engageable with an axially movable cone collar 35. This collar 35 is shown as provided with a peripheral groove 36 within which rides a shoe 37 carried by an axially movable bar 38 mounted for sliding motion through the turret end member 17. On its outer end this bar 38 carries a cam roller 39 for a purpose which will later appear. Suitable anti-friction bearings at 40 and 41 support the spindle shaft 15 for rotation relative to the turret.

The chuck 12 may be of any suitable type, but as herein shown it carries a plurality of work-engaging jaws 50 which are secured to carrier members 51 having inclined ribs 52 engaging in mating inclined ways 53 in a block 54 movable axially of the chuck, such axial movement serving to move the chuck jaws from or toward each other so as to open or close the chuck. This block 54 is shown as rotatably secured as through a block 55 and a screw 56 to the end of a draw bar or shaft 57 which is slidable axially within the spindle shaft 15, sliding of this shaft thus serving to open or close the clutch jaws. As shown this shaft 57 is keyed as at 58 against rotation relative to the spindle shaft 15. The opposite extremity is threaded as shown at 60 in Figure 8 and engageable therewith is a nut element 61. This nut element is mounted in suitable anti-friction bearings 62 within a hollow cap member 63 secured to the opposite end of the spindle shaft 15. As shown this member 63 is keyed to the shaft 15 at 64 and a retaining nut 65 may be used to hold the member 63 against endwise removal therefrom. The nut member 61 is retained against axial movement relative to the shaft 15 so that by rotation thereof the draw bar 57 is moved axially thus to open or close the chuck, depending on the direction of such rotation.

To the outer end of the nut member 61 is secured the tooth clutch element 68. Beyond these clutch elements 18 and 68 is positioned a vertical frame member 71 of the machine extending between the frame members 3 and 4, and arranged in axial alinement with the spindle when in its work loading and unloading position there is positioned means for stopping the rotation of the spindle and for opening or closing the chuck carried thereby. This means comprises a sleeve 70 keyed against rotation in the frame member 71 as by the key 710 but carrying at its end adjacent to the spindle an annular toothed clutch member 72. Journaled axially within the sleeve 70 is a rotatry shaft 73 which has a tooth clutch portion 74 herein shown as integral therewith, which may be engaged with the tooth clutch element 68 of the chuck-actuating nut 61. As shown this shaft 73 has a socket portion 75 in its inner end for the reception of the end of the draw bar 57, thus to provide suitable clearance therefor. The sleeve 70 is provided with a head 76 having an annular peripheral groove 77 therein within which may engage the forked extremities of a lever 78 fulcrumed at 79 in a bracket 80 carried by the stationary frame member 71. By rocking this lever 78 the sleeve 70 and the shaft 73 rotatably carried thereby may be moved axially to bring their respective clutch elements 72 and 74 into or out of engagement with the spindle clutch element 18 and the chuck actuating nut 68, respectively. The shaft 73 is held to move axially with the sleeve 70, by the clutch element 74 on one end and a collar 800 secured thereto, as by the set screw 81, on the opposite end of the sleeve 70.

Slidably keyed on the outer end of the shaft 73 is a driving collar 82 having a socket 83 within which the collar 800 is fixed and this member 82 is provided with a flange 84 for the reception of screws 85 which secure this member 82 to a sprocket wheel 86. This wheel is journaled on a collar 87 rigidly secured to the frame member 71 as by the screws 88, and the sprocket wheel 86 is secured against axial motion on the collar 87 by the retaining ring 89 secured by screws 90 to the outer end of the sleeve 87. Thus it will be seen that the sleeve 70 is axially movable relative to the frame member 71, but is non-rotatable, while the shaft 73 is axially movable with the sleeve 70 and it may be rotated by rotation of the sprocket wheel 86. For effecting such rotation this sprocket wheel may be connected as by the chain 92 to the shaft of a motor 93, which as shown best in the diagram of Figure 9, may be a three-phase induction motor.

Whenever one of the work spindles is in its work loading or unloading position it is therefore in axial alinement with the axially movable sleeve 70 and the rotatable shaft 73. In this position the cam follower 39 of the clutch actuating bar 38 is between the jaws 100 of a clutch shifter block 101 (see Figures 3 and 6). This clutch shifter block is eccentrically pivoted on the shaft 102, which is journaled in a bracket 103 carried by a fixed frame member 104 of the machine, and on the outer end of the shaft 103 is fixed an actuating handle 110. When this handle is in the full line position shown in Figure 1 extending downwardly, the cam follower groove 111 of the block 101 is in vertical position and in condition to register with the follower 39 when the clutch shifter bar 38 is in clutch-engaging position shown in Figure 3. A lug 115, eccentrically disposed to the shaft 102, and if desired integral with the handle 110, is connected through a link 116 with the outer end of the lever 78 through a yielding connection comprising a coil spring 117 bearing at one end on the lug 115 and at the other end against the adjusting and check nuts 118 on the link 116. Other nuts 119 on the extremity of the link 116 prevent disengagement of the handle 110 therefrom.

By swinging the outer end of the handle 110 upwardly into the dotted line position of Figure 1 when the turret is in indexed position, the clutch shifter rod 38 is moved to unclutch the rotary driving connection to the spindle which is in loading position and at the same time the clutch elements 72 and 74 are moved into engagement with the mating clutch elements 18 and 68 on the spindle and chuck-actuating nut, respectively, as shown in Figure 6. The spring 117 permits yielding of the parts when the teeth of these mating clutches strike on each other when the clutches are first brought together, permitting further rotation of the spindle to bring the tooth clutch elements into such condition that the teeth of one will slip ino the recesses between the teeth of the mating element. When this occurs the pressure of the clutch elements against each other produces a braking effect to the rotation of the spindle and their mating teeth provide for positive engagement therebetween. If now it is desired to chuck a piece of work, the work is placed between the jaws 50 and the motor 93 is started in a direction to cause its rotation to turn the nut 61 in a direction to pull the draw bar 57 away from the chuck face which brings the jaws toward each other until they grip the work. As soon as the work is thus gripped so that the jaws can no longer move toward each other, torque applied to the nut 61 acts through the jaws and the work to rotate the spindle 15 until it is positively stopped by engagement of its clutch jaws against the stationary clutch jaws of the clutch 72, thus stalling the motor. It will be noted from an inspection of Figure 5 that the teeth 125 and 126 of the clutch members 72 and 74 are relatively narrow compared with the spaces therebetween and similarly the teeth on the mating clutch members which are shown in dotted lines in this figure, are of much less thickness than these spaces so that there is considerable angular lost motion between these clutch elements. Thus, after the work has been gripped by the chuck jaws, there is an opportunity for a substantial angular motion of the chuck before the sides of these teeth come into contact and positively stop the rotation of the spindle. The extent of the blow produced by this positive stop may be predetermined by varying the voltage supplied to the motor 93. Means for accomplishing this will be later described. If the chuck is to be opened, the rotation of the spindle is stopped and the tooth clutches are thrown into engagement by lifting the lever 110, as previously described, and the motor 93 is made to rotate in the reverse direction. Such rotation initially through the engagement of the chuck on the work brings the toothed spindle clutch to a positive stop in the reverse direction with a sudden blow, which frees the jaws from the work, whereupon further rotation of the motor acting through the nut 61 and the draw bar 57, separates the chuck jaws to the desired extent, whereupon rotation of the motor 93 is stopped.

After the work has been chucked the handle 110 is lowered to its former position, which acts to disconnect the tooth clutches and to again connect the spindle for rotation by the shaft 2, whereupon the turret may be indexed and the next adjacent spindle be placed in position for unchucking finished work and chucking work to be operated upon. As shown the lever 110 may be held in either of its positions by a spring detent 130 acting on a segment 131 and controlled by a lever 132 pivoted at 133 to the handle member 110.

Wiring diagrams for the motor are shown in Figure 9. Referring to this figure, the three line wires of a three-phase alternating circuit are shown at 140, 141 and 142. Between the lines 141 and 140 and lines 141 and 142 are positioned the auto-transformers 143 and 144, respectively. At 145 and 146 are shown spring push buttons, which, as shown in Figure 1, may be mounted on the machine frame convenient to the operator adjacent to the chucks, for operating the motor in chucking and unchucking directions, respectively. The unchucking push button 146 controls energy supply between two of the power lines such as 141 and 142 to actuate the relay 147 which when energized connects the lines 140, 141 and 142 to the windings of the motor 93 to drive the motor in a direction to separate the chuck jaws 50. The push button 145 when pressed takes energy from the lines 141 and 142 and energizes the relay 148 to close the circuit through the motor windings from the line 141 and the voltage selector arms 150 and 151 for reverse direction of motion of the motor 93, thus to move the chuck jaws to chuck the work. The selector arms 150 and 151 as shown are connected for simultaneous operation so as to control the voltage applied to the motor windings when the motor is operated in clutching direction, thus to determine the amount of pressure of the chuck jaws on the work when the motor stalls at the end of the chucking operation. Thus adjustment of the selector arms 150 and 151 to the right from the position shown acts to decrease the voltage applied to the motor windings and thus to decrease the pressure with which the chucking jaws are closed on the work. As soon as the motor has operated to the desired extent, release of pressure on either of the push buttons 145 and 146 permits the corresponding relays 147 and 148 to open, thus opening the motor circuit.

From the foregoing description of an embodiment of this invention it should be evident to those skilled in the art that various changes and modifications might be made without departing from the spirit or scope of this invention as defined by the appended claims.

I claim:

1. In combination, a work spindle, a chuck on said spindle, means for rotating said spindle, means for opening and closing said chuck, operating means for said chuck opening and closing means, a movable handle member, and operative connections from said movable member to said means to retain said spindle operatively coupled to said rotating means and said chuck opening and closing means out of operative connection with said operating means in one position of said member, and to hold said spindle rotating means disconnected from said spindle, and said operating means operatively coupled to said chuck opening and closing means in another position of said member.

2. In combination, a work spindle, a chuck on said spindle, means for rotating said spindle, means for opening and closing said chuck, operating means for said chuck opening and closing means, a lever, and operative connections from said lever to said means to retain said spindle operatively coupled to said rotating means and said chuck opening and closing means out of operative connection with said operating means in one position of said lever, and to hold said spindle rotating means disconnected from said spindle, and said operating means operatively coupled to said chuck opening and closing means in another position of said lever.

3. In combination, a work spindle, a chuck on said spindle, means for rotating said spindle, non-rotatable spindle-holding means, means for opening and closing said chuck, operating means for said chuck opening and closing means, a movable handle member and operative connections from said movable member to said means to retain said spindle operatively coupled to said rotating means and disconnected from said holding means and said chuck opening and closing means out of operative connection with said operating means in one position of said member, and to hold said spindle rotating means disconnected from said spindle and operatively coupled to said holding means, and said operating means operatively coupled to said chuck opening and closing means in another position of said member.

4. In combination, a work spindle, a chuck on said spindle, means for rotating said spindle, non-rotatable spindle-holding means, means for opening and closing said chuck, operating means for said chuck opening and closing means, a lever, and operative connections from said lever to said means to retain said spindle operatively coupled to said rotating means and disconnected from said holding means and said chuck opening and closing means out of operative connection with said operating means in one position of said lever, and to hold said spindle rotating means disconnected from said spindle and operatively coupled to said holding means, and said operating means operatively coupled to said chuck opening and closing means in another position of said lever.

5. In combination, a work spindle, a chuck on said spindle, means for rotating said spindle, means for opening and closing said chuck, operating means for said chuck opening and closing means, a movable handle member, operative connections from said movable member to said means to retain said spindle operatively coupled to said rotating means and said chuck opening and closing means out of operative connection with said operating means in one position of said member, and to hold said spindle rotating means disconnected from said spindle, and said operating means operatively coupled to said chuck opening and closing means in another position of said member, and means for rendering said operating means operative or inoperative.

6. In combination, a work spindle, a chuck on said spindle, means for rotating said spindle, means for opening and closing said chuck, operating means for said chuck opening and closing means, a lever, operative connections from said lever to said means to retain said spindle operatively coupled to said rotating means and said chuck opening and closing means out of operative connection with said operating means in one position of said lever, and to hold said spindle rotating means disconnected from said spindle, and said operating means operatively coupled to said chuck opening and closing means in another position of said lever, and means for rendering said operating means operative or inoperative.

7. In combination, a work spindle, a chuck on said spindle, means for rotating said spindle, means rotatable about an axis longitudinally of said spindle for opening and closing said chuck, means actuable to disconnect said spindle from said rotating means and to initially stop the rotation of said spindle, a positive stop for said spindle spaced from its initial stopping position in chuck-closing rotating direction, and means actuable to then rotate said opening and closing means acting when said chuck has engaged the work to rotate said spindle against said positive stop.

8. In combination, a work spindle, a chuck on said spindle, means for rotating said spindle, means rotatable about an axis longitudinally of said spindle for opening and closing said chuck, means actuable to disconnect said spindle from said rotating means and to initially stop the rotation of said spindle, a positive stop for said spindle spaced from its initial stopping position in chuck-closing rotating direction, means actuable to then rotate said opening and closing means acting when said chuck has engaged the work to rotate said spindle against said positive stop, and means for adjusting the violence of such positive stopping to thereby adjust the engaging pressure of said chuck on the work.

9. In combination, a hollow work spindle, a shaft coaxial with said spindle, means including a clutch connection for rotating said spindle, a chuck carried by one end of said spindle, connections from said shaft for opening and closing said chuck by movement of said shaft relative to said spindle in opposite directions, a rotary element for effecting such shaft movement, a non-rotatable axially movable sleeve in alinement with said spindle at the opposite end from said chuck, a shaft movable axially with and journaled for rotation in said sleeve, cooperating clutch elements on the adjacent ends of said spindle and sleeve, cooperating clutch elements on the adjacent ends of said rotary shaft element and sleeve-carried shaft, means effective to operatively disconnect said clutch connections and to move said sleeve and the shaft carried thereby axially to engage their respective clutch elements, and means for rotating said sleeve shaft.

10. In combination, a hollow work spindle, a chuck carried by said spindle at one end, an element rotatably carried within the hollow of said spindle, operative connections between said element and chuck for opening and closing said chuck by rotation of said element relative to said spindle, means including a clutch for rotating said spindle, a rotatable element, and single means actuable to release said clutch and stop the rotation of said spindle and to operatively connect said elements for opening or closing said chuck by rotation of said second mentioned element.

11. In combination, a rotatable spindle, a chuck carried by said spindle, an element rotatable relative to said spindle for opening and closing said chuck, a positive stop for the rotation of said spindle, a rotatable shaft, a motor for rotating said shaft, and means actuable to brake the rotation of said spindle and to position said positive stop in operative relation thereto and to couple said shaft to said element to actuate said chuck, engagement of which chuck on the work couples said element to said spindle and rotates said spindle by the rotation of said shaft against said stop.

12. In combination, a rotatable spindle, a chuck carried by said spindle, an element rotatable relative to said spindle for opening and closing said chuck, a positive stop for the rotation of said spindle, a rotatable shaft, an electric motor for rotating said shaft, means actuable to brake the rotation of said spindle and to position said positive stop in operative relation thereto and to couple said shaft to said element to actuate said chuck, engagement of which chuck on the work couples said element to said spindle and rotates said spindle against said stop stalling said motor, and means for adjusting the voltage applied to rotate said motor to thereby adjust the pressure with which said chuck may grip the work on chucking actuation thereof.

13. In combination, a rotatable spindle, a chuck carried by said spindle, an element rotatable relative to said spindle for opening and closing said chuck, a rotatable and axially movable shaft in alinement with the axis of rotation of said element, a non-rotatable member movable axially with said shaft, cooperating toothed clutch elements on said member and spindle and on said element and shaft respectively, means including a clutch for rotating said spindle, and means for operatively connecting or disconnecting said spindle-rotating clutch, and for moving said shaft and member axially out of or into clutching engagement with said spindle and element respectively, said last mentioned means including a yielding element permitting delayed full engagement of said cooperating toothed elements should they initially incorrectly engage.

14. In combination, a rotatable spindle, a chuck carried by said spindle, an element rotatable relative to said spindle for opening and closing said chuck, a rotatable and axially movable shaft in alinement with the axis of rotation of said element, a non-rotatable member movable axially with said shaft, cooperating toothed clutch elements on said member and spindle and on said element and shaft respectively, means including a clutch for rotating said spindle, means for operatively connecting or disconnecting said spindle-rotating clutch and for moving said shaft and member axially out of or into clutching engagement with said spindle and element respectively, said last mentioned means including a yielding element, an electric motor for rotating said shaft in either direction, and a normally open switch for controlling such rotation in each direction.

15. In combination, a rotatable turret, a plurality of rotary spindles carried by said turret, means for rotating said spindles including a clutch for each spindle, a chuck carried by each spindle, means at each spindle to open or close its respective chuck, means for indexing said turret to bring said spindles in succession to a work loading and unloading position, and means at said position actuable to throw out the clutch for the spindle therein and engage and stop the rotation thereof, and to open or close its respective chuck.

16. In combination, a rotatable turret, a plurality of rotatable spindles carried by said turret, each of said spindles having a chuck at one end and a clutch element at the other end, a chuck actuating element rotatable relative to each spindle and having a clutch element coaxial with its respective spindle clutch element, a stationary frame adjacent to said turret, means for indexing said turret to bring the clutching elements of each spindle successively into a definite relation with said frame, a sleeve axially movable and non-rotatably carried in said frame, a shaft journaled in said sleeve and movable axially therewith, said sleeve and shaft having clutch elements movable by such axial movement into and out of cooperative relation with the spindle-carried clutch elements in said definite relation, and means for rotating said shaft in either direction.

17. In combination, a rotatable turret, a plurality of rotatable spindles carried by said turret, each of said spindles having a chuck at one end and a member actuable to open and close said chuck, spindle driving means including a clutch for each spindle, means for indexing said turret, mechanism with which each spindle may cooperate in one indexed position including a spindle brake and stop and a chuck actuator, and means for unclutching the spindle chuck in said position and for rendering said mechanism operative to stop the rotation of said spindle and to actuate said member to open or close its respective chuck.

18. In combination, a work spindle, a chuck on said spindle, means for rotating said spindle, means operatively connectible therewith for opening and closing said chuck, means actuable to disconnect said spindle from said rotating means and for simultaneously braking the spindle rotation and operatively connecting said chuck opening and closing means, and means for then actuating said opening and closing means.

19. In combination, a rotatable spindle, a chuck carried by said spindle, rotary means tending to rotate said spindle for closing and opening said chuck, an electric motor for driving said rotary means, means actuable to frictionally stop the rotation of said spindle, a positive stop against which said spindle is rotated from its normal friction stopped position by said motor when said chuck has closed on the work placed therein, and means for adjusting the voltage applied to said motor to determine the tightness of the chuck grip on the work when the rotation of said spindle is positively stopped.

20. In combination, a rotatable spindle, a chuck carried by said spindle, rotary means tending to rotate said spindle for closing and opening said chuck, means for driving said rotary means, means actuable to frictionally stop the rotation of said spindle, a positive stop against which said spindle is rotated from its normal friction stopped position by said driving means when said chuck has closed on the work placed therein, and means for adjusting the torque exerted by said driving means to determine the tightness of the chuck grip on the work when the rotation of the said spindle is positively stopped.

FRANK L. CONE.